Patented Sept. 1, 1936

2,053,106

UNITED STATES PATENT OFFICE 2,053,106

COMPRESSED COFFEE TABLET AND METHOD OF PREPARING SAME

Jorge M. Piacentini, Buenos Aires, Argentina, assignor to Noel & Cia. Ltda., Buenos Aires, Argentina, a corporation of Argentina No Drawing. Application June 22, 1934, Serial No. 731,887. In Argentina June 15, 1934

8 Claims. (Cl. 99—66)

This invention relates to a new coffee product, in compressed tablet form, and to an improved method of making it.

The new method and product enable an increase of from 30 to 50% in the coffee strength extracted from the coffee, as compared with ordinary methods of extraction.

Coffee at present is shipped in the bean and is ground when sold or used; or, in the case of ground coffee, the coffee must be packed in vacuum tins to keep its freshness.

As compared with ground coffee, commonly produced and used, the compressed tablets of the present invention enable a greatly increased number of cups of coffee to be produced from a definite weight of coffee, and the tablets have other advantages, such as those hereinafter set forth.

According to the present invention the roasted coffee in a finely ground state is compounded with solutions of suitable organic colloids and with sugar, etc., followed by drying of the resulting mixture, regrinding to give a finely divided product and finally compressing the product into tablet form.

The process is advantageously carried out with employing a part only of the finely ground coffee in that part of the process in which it is incorporated with a solution of an organic colloid, and with admixture of the remainder of the finely ground coffee after the drying and regrinding of the compounded mixture. The nature of the process will be further illustrated by the following specific examples, the percentages being by weight:

Example 1.—The following ingredients are used in making the product:

|  | Per cent |
| --- | --- |
| Gelatine | 12.19 |
| Sugar | 6.09 |
| Stearine | 2.13 |
| Tricalcium phosphate | .30 |
| Coffee | 79.29 |

The gelatine is dissolved in four times its weight of water at a temperature of 85 to 95° C. and the stearine is added with rapid agitation until an emulsion is produced. The sugar and tricalcium phosphate are mixed with 46% of the finely ground coffee to form an intimate mixture and the hot emulsion of gelatine and stearine is poured on this mixture rapidly and the whole is mixed until a homogeneous paste is obtained.

The homogeneous paste is rapidly dried in a vacuum apparatus at a temperature of about 35° C. and under a vacuum of about 60–70 cm. The thus dried paste is ground to a fine state of subdivision comparable to that of the original grinding of the coffee. The remaining 54% of the finely ground coffee is then admixed and blended with the reground paste to obtain a homogeneous admixture, after which the mixture is subjected to a rapid drying for about 30 minutes at a temperature of about 50° C., a humidity of from 0 to 5% and a vacuum of about 50 mm.

The dry product is rapidly cooled and immediately compressed into tablets of, for example, 1 inch in diameter and ¼ inch in thickness. The atmosphere in which the powder is compressed is not above 13° C. and the relative humidity should no be above 50%.

The tablets thus produced should be packed immediately after compression.

Example 2.—The following formula is used in this example:

|  | Per cent |
| --- | --- |
| Special casein (hereafter described) | 8.29 |
| Sugar | 8.29 |
| Tricalcium phosphate | .49 |
| Coffee | 82.92 |

The special casein is made by dissolving 50 parts by weight of a refined and purified casein in 180 parts by weight of water containing 1 part of pure ammonia and with rapid agitation. The temperature is then raised until the odor of ammonia disappears, after which the solution is filtered and the filtered solution is used in the process.

The sugar and tricalcium phosphate are mixed with 80% of the finely ground coffee to form a homogeneous admixture and the hot solution of casein is added and the whole is fixed until a homogeneous admixture is formed. This paste is then dried and the dried paste is ground in the manner described in Example 1. The remaining 20% of finely ground coffee is then thoroughly mixed with the reground product until a thorough intermixture is obtained after which the mixture is subjected to a final drying under a vacuum and to cooling and compression into tablet form, followed by packaging immediately after compression, as in Example 1.

In the processes of the above examples the other ingredients compounded with the coffee have a protective action on the coffee and appear to have a pronounced action in extraction of the coffee from the compressed tablets. They also serve as binders in forming the compressed tablets. Whereas finely ground coffee rapidly loses its flavor, freshness and aroma, the compressed tablets of the present invention protect and preserve the flavor, freshness and aroma of the coffee and also insure extraction of a greatly increased proportion of the strength of the coffee. For example, if 1 kilogram of ground coffee is needed, according to common methods of use, for making 200 cups of coffee, there would be required only about 500 to 700 grams of coffee in tablet form to obtain the same quantity of liquid coffee of comparable strength and flavor. The coffee as a result is made much more available so that a lesser amount of coffee is needed for a given number of cups.

The greatly increased strength of coffee obtainable from the present product far more than compensates for the operations involved in treating the finely ground coffee to prepare it in compressed tablet form; and the improved keeping qualities of the compressed tablets are a further advantage which the present invention presents over ground coffee products heretofore commonly made.

The compressed tablet form provided by the present invention is easy and sanitary to handle and enables accurate regulation of the amount of coffee used, since the user soon gets to know exactly how many tablets are required for a definite number of cups of coffee of a desired strength and is thereby enabled to eliminate waste.

I claim:

1. The method of preparing coffee in compressed tablet form which comprises admixing finely ground, roasted coffee with an aqueous solution of an organic colloid and with sugar to form a homogeneous paste, drying the paste, regrinding the dried product to form a finely divided product, admixing therewith a further amount of finely ground, roasted coffee and compressing the mixture into tablet form.

2. The method of preparing coffee in compressed tablet form which comprises admixing finely ground, roasted coffee with sugar and with a small amount of tricalcium phosphate, adding to the resulting mixture a hot solution of an organic colloid and further admixing the same to form a homogeneous paste, drying the resulting paste, grinding the dried product to form a finely divided product and compressing the dried product into tablet form.

3. The improvement in the process of the preceding claim in which the dried and ground paste product is admixed with further amounts of finely ground roasted coffee and the mixture is subjected to a further drying before the final compressing into tablet form.

4. The method of preparing coffee in compressed tablet form which comprises dissolving about 12.19 parts of gelatine in about 4 times its weight of water at about 85 to 95° C., adding about 2.13 parts of stearine thereto and agitating until an emulsion is obtained, adding the resulting hot emulsion to an admixture of about 36.8 parts of finely ground roasted coffee, about 6.09 parts of sugar and about .30 parts of tricalcium phosphate and mixing the whole until a homogeneous paste is obtained, rapidly drying the paste under a vacuum at a temperature of about 35° C. until it is in a condition permitting grinding, grinding the dried paste to a finely divided state, admixing with the ground product about 43.2 parts of finely ground roasted coffee, drying the resulting mixture and compressing the same into tablet form.

5. The method of preparing coffee in compressed tablet form which comprises adding to a mixture of about 66.33 parts of coffee, 8.29 parts of sugar, and .49 parts of tricalcium phosphate, a solution of casein containing about 8.29 parts of casein dissolved in about 30 parts of water and admixing the whole to form a homogeneous paste, drying the resulting paste, grinding the dried paste to form a finely divided product, admixing therewith about 16.58 parts of finely ground roasted coffee, further drying the resulting mixture and compressing the same into tablet form.

6. A new coffee product in compressed tablet form comprising finely ground roasted coffee treated with an organic colloid and sugar associated and intimately admixed with untreated, finely ground roasted coffee.

7. A new coffee product in compressed tablet form comprising finely ground roasted coffee treated with casein and sugar associated and intimately admixed with untreated, finely ground roasted coffee.

8. A new coffee product in compressed tablet form comprising finely ground roasted coffee treated with an organic colloid and sugar and tricalcium phosphate associated and intimately admixed with untreated, finely ground roasted coffee.

JORGE M. PIACENTINI.